United States Patent

Dedrich et al.

Patent Number: 5,855,095
Date of Patent: Jan. 5, 1999

[54] BOLTLESS GLASS CHANNEL ATTACHMENT

[75] Inventors: Paul Martin Dedrich, Grand Blanc; Matthew C. Patterson, Warren, both of Mich.

[73] Assignee: General Motors Corporation, Detroit, Mich.

[21] Appl. No.: 851,790

[22] Filed: May 6, 1997

[51] Int. Cl.$^6$ ............................ B60J 5/04; B25G 3/36
[52] U.S. Cl. ........................ 49/502; 49/375; 403/389
[58] Field of Search ........................... 49/502, 452, 414, 49/453, 454, 375; 403/389, 388, 384; 411/107, 970, 111, 112, 113

[56] References Cited

U.S. PATENT DOCUMENTS

| | | | |
|---|---|---|---|
| 1,256,706 | 2/1918 | Lewis | 411/107 |
| 1,878,199 | 9/1932 | Stenger | 411/170 |
| 2,258,342 | 10/1941 | Tinnerman | 411/112 |
| 2,345,053 | 3/1944 | Judd et al. | 411/523 |
| 2,893,458 | 7/1959 | Flora | 411/112 |
| 2,937,682 | 5/1960 | Patten | 411/112 |
| 3,009,499 | 11/1961 | Weihe | 411/112 |
| 3,126,038 | 3/1964 | Jaworski | 411/112 |
| 3,430,674 | 3/1969 | Forbush | 411/107 |
| 3,782,437 | 1/1974 | Seckerson | 411/107 |
| 4,067,292 | 1/1978 | Friedman et al. | 403/388 |
| 4,422,276 | 12/1983 | Paravano | 411/107 |
| 4,761,915 | 8/1988 | Marz | 49/502 |
| 4,859,977 | 8/1989 | Mochizuki et al. | 411/112 |
| 4,956,942 | 9/1990 | Lisak et al. | 49/212 |
| 5,176,482 | 1/1993 | Reinl | 411/523 |
| 5,259,165 | 11/1993 | Koyama | 403/388 |
| 5,430,976 | 7/1995 | Wirsing | 49/452 |
| 5,624,150 | 4/1997 | Venier | 49/502 |
| 5,653,481 | 8/1997 | Alderman | 411/533 |
| 5,694,719 | 12/1997 | Bejune et al. | 49/502 |

FOREIGN PATENT DOCUMENTS

| | | | |
|---|---|---|---|
| 2418124 | 10/1975 | Germany | 411/112 |
| 6415320 | 7/1966 | Netherlands | 411/111 |
| 1083032 | 9/1967 | United Kingdom | 411/112 |

*Primary Examiner*—Daniel P. Stodola
*Assistant Examiner*—Curtis Cohen
*Attorney, Agent, or Firm*—Charles E. Leahy

[57] ABSTRACT

A vehicle door has a glass run channel extending vertically to guide vertical movement of a window glass. A bracket is mounted on the door adjacent the bottom of the glass run channel and has an upwardly opening slot therein. A threaded stud is carried by the bottom of the glass run channel. An annular roller of molded plastic construction is threaded onto the stud and has a circumferential groove by which the annual roller may be installed into the upwardly opening slot of the bracket to thereby mount the bottom of the glass run channel on the door. The stud is preferably threadably attached to the bottom of the glass run channel so that rotation of the threaded stud relative the glass run channel will adjust the position of the annular roller to adjust the bottom of the glass run channel relative to the door.

2 Claims, 2 Drawing Sheets

BOLTLESS GLASS CHANNEL ATTACHMENT

TECHNICAL FIELD

The invention relates to a glass channel for a vehicle door and, more particularly, provides an improved attachment for adjustably mounting the bottom of the glass run channel on the vehicle door.

BACKGROUND OF THE INVENTION

It is well known in vehicle doors to have a window glass which is vertically raised and lowered between open and closed positions. The fore and aft edges of the glass are captured and guided within glass run channels which are mounted to extend generally vertically within the vehicle door. The top and bottom of the glass channels are suitably attached to the door.

It would be desirable to provide a new and improved attachment for attaching the bottom of the glass channel to the door in a manner which reduces assembly labor and assures proper and adjustable location of the glass run channel on the door.

SUMMARY OF THE INVENTION

According to the invention, a vehicle door has a glass run channel extending vertically to guide vertical movement of a window glass. A bracket is mounted on the door adjacent the bottom of the glass run channel and has an upwardly opening slot therein. A threaded stud is carried by the bottom of the glass run channel. An annular roller of molded plastic construction is threaded onto the stud and has a circumferential groove by which the annular roller may be installed into the upwardly opening slot of the bracket to thereby mount the bottom of the glass run channel on the door. The stud is preferably threadably attached to the bottom of the glass run channel so that rotation of the threaded stud relative the glass run channel will adjust the position of the annular roller to adjust the bottom of the glass run channel relative to the door.

DESCRIPTION OF THE PREFERRED EMBODIMENT

Figure 1:
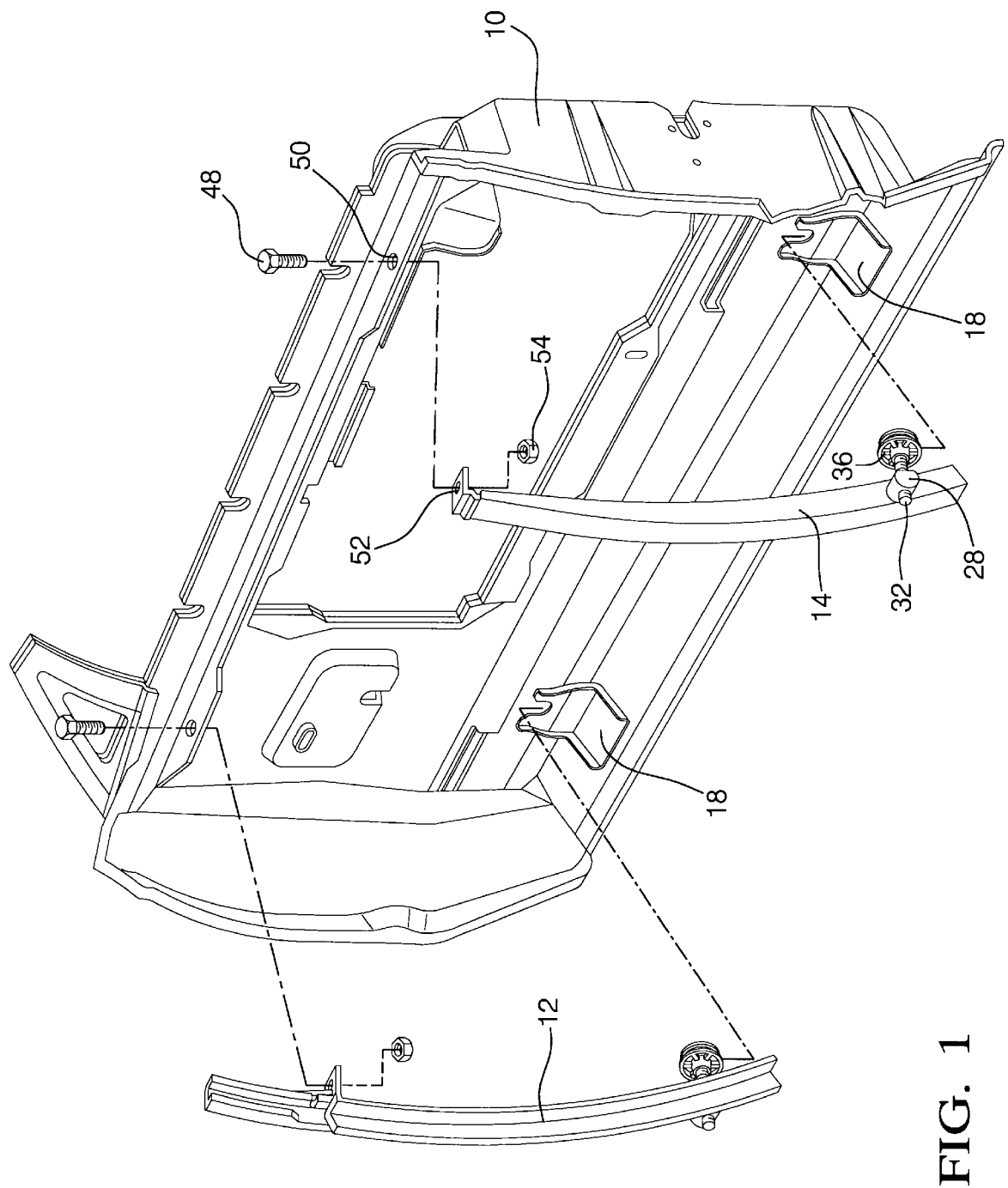
FIG. 1 is an exploded view of the vehicle door according to the invention.

Referring to FIG. 1, there is shown a vehicle door panel 10 on which a front glass run channel 12 and a rear glass run channel 14 are to be mounted. A panel of window glass, not shown, will be suitably and conventionally engaged with the glass run channels 12 and 14 to guide vertical up and down movement of the window glass between open and closed positions.

Figure 2:
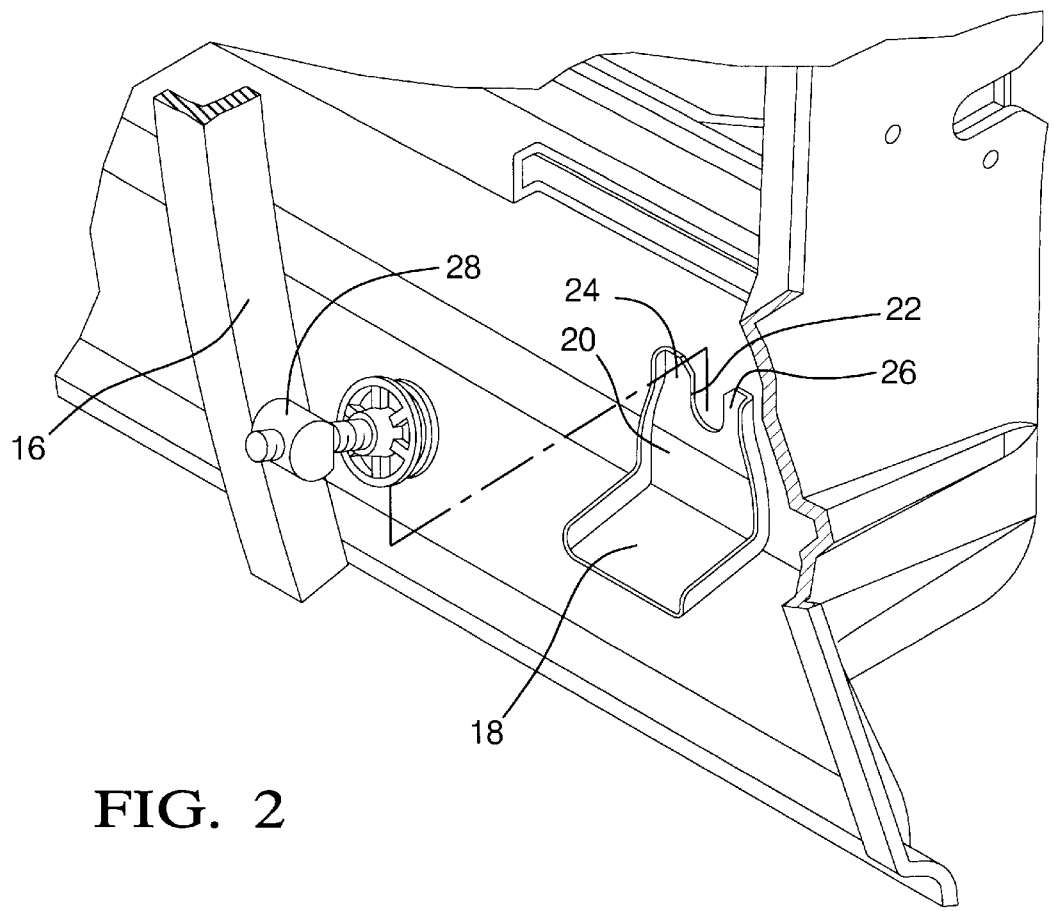
FIG. 2 is an enlarge fragmentary view of the rear lower corner of the door of FIG. 1.
Figure 3:
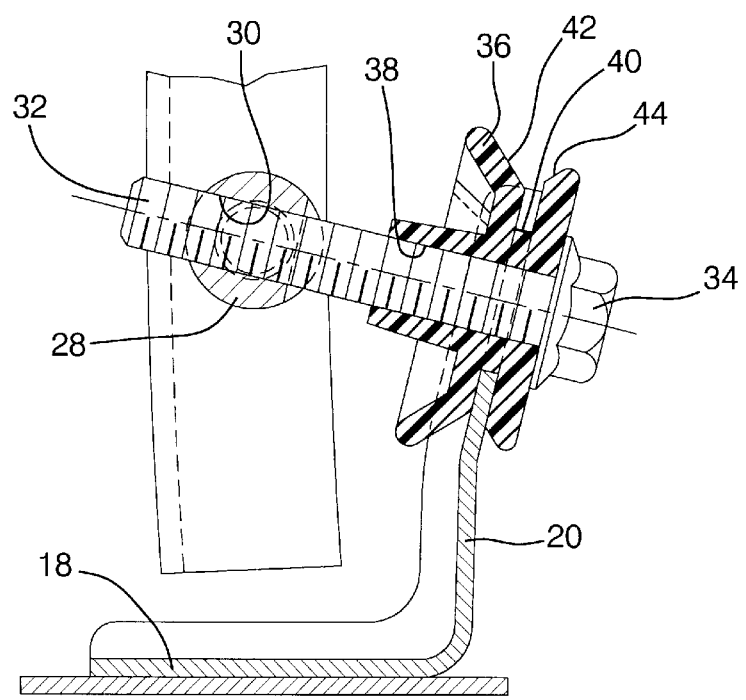
FIG. 3 is a sectional view taken through the mounting bracket and annular roller mounting the lower end of the glass run channel on the vehicle door.

Referring to FIGS. 2 and 3, it is seen that a bracket 18 is suitably welded onto the lower rear corner of the door. The bracket 18 includes a vertical upstanding leg 20 having a upwardly opening slot 22 defined between forked legs 24 and 26.

An internally threaded nut 28 is welded onto the side of glass run channel 14 and has a threaded hole 30 therethrough for threadedly receiving a headed stud 32. The headed stud 32 has a hex-head 34. An annular roller 36 of molded plastic construction has internal threads 38 by which the annular roller 36 is threaded onto the headed stud 32 and into engagement with the hex-head 34 as shown in FIG. 3. The annular roller 36 has a circumferential groove 40 by which the annular roller 36 may be lowered into the upwardly opening slot 22 of the bracket 18. As best seen in FIG. 3, the annular roller 36 has chamfered walls 42 and 44 provided on each side of the circumferential groove 40 to assist in guiding the roller 36 into engagement with the bracket 20.

It will be appreciated that rotation of the headed stud 32 via a wrench applied to the hex-head 34 will adjust the mounted position of the glass channel 14 relative to the mounting bracket 18 to thereby align the path of up and down movement of the window panel. For efficient assembly of the motor vehicle, the threaded stud 32 and roller 36 are preferably installed onto the nut 28 of the glass run channel 14 at a precisely adjusted position which is predetermined and known to provide the precise mounting location of the roller relative to the glass run channel. The fit between the threaded stud 32 and the nut 30 is an interference fit which may be provided by an interference between the threads or application of an adhesive. Likewise, the fit between the threaded stud 32 and the roller 36 is preferably an interference fit which may be provided by interference fit between the threads or application of an adhesive between the threaded stud and the roller 36. It will be appreciated that the annular shape of the roller 36 will enable and assure the drop-in installation of the roller 36 into the upwardly opening slot 22 of the bracket 18, irrespective of the rotary position of the annular roller 36 relative the glass run channel.

Referring again to FIG. 1, it is seen that the upper end of the glass run channel is suitably attached to the upper end of the door by a bolt 48 which drops through bolt hole 50 of the door panel 10, bolt hole 52 of the glass run channel, and receives a nut 54.

Thus, the invention provides a new and improved glass channel attachment for a vehicle door.

We claim:

1. In a vehicle door having a glass run channel extending vertically to guide the vertical movement of the window glass, the improvement comprising:

a bracket mounted on the door adjacent the bottom of the glass run channel and having an upwardly opening slot therein;

a threaded stud carried by the bottom of the glass run channel;

an annular roller of molded plastic construction threaded onto the stud and having a circumferential groove by which the annular roller is installed into the upwardly opening slot of the bracket to thereby mount the bottom of the glass run channel on the door and further enable rotation of the threaded stud relative to the glass run channel to thereby adjust the position of the annular roller to adjust the bottom of the glass run channel relative to the door.

2. The improvement of claim 1 further characterized by the stud being threadably attached to the bottom of the glass run channel so that rotation of the threaded stud relative to the glass run channel will adjust the position of the annular roller to adjust the bottom of the glass run.

* * * * *